United States Patent
Walton et al.

(10) Patent No.: US 8,713,350 B2
(45) Date of Patent: Apr. 29, 2014

(54) HANDLING ERRORS IN A DATA PROCESSING SYSTEM

(75) Inventors: Andrew C. Walton, Rocklin, CA (US); Jeffrey A. Barlow, Wilton Manors, FL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 886 days.

(21) Appl. No.: 12/633,648

(22) Filed: Dec. 8, 2009

(65) Prior Publication Data
US 2011/0138219 A1 Jun. 9, 2011

(51) Int. Cl.
*G06F 11/00* (2006.01)

(52) U.S. Cl.
USPC .................. 714/3; 714/1; 714/25; 714/48

(58) Field of Classification Search
USPC ......................... 714/3, 25, 47.1, 48
See application file for complete search history.

(56) References Cited

U.S. PATENT DOCUMENTS

| | | | |
|---|---|---|---|
| 5,632,013 A | 5/1997 | Krygowski et al. | |
| 6,000,046 A | 12/1999 | Passmore | |
| 6,502,208 B1 | 12/2002 | McLaughlin et al. | |
| 6,622,260 B1 | 9/2003 | Marisetty et al. | |
| 6,647,517 B1 | 11/2003 | Dickey et al. | |
| 6,654,908 B1 | 11/2003 | Lindsay et al. | |
| 6,665,818 B1 | 12/2003 | Dickey et al. | |
| 6,675,324 B2 | 1/2004 | Marisetty et al. | |
| 6,711,703 B2 | 3/2004 | MacLaren et al. | |
| 6,823,476 B2 | 11/2004 | Williams et al. | |
| 6,886,114 B2 | 4/2005 | Parry | |
| 6,915,460 B2 | 7/2005 | Austen et al. | |
| 6,934,890 B2 | 8/2005 | Lopke | |
| 6,948,094 B2 | 9/2005 | Schultz et al. | |
| 7,103,639 B2 | 9/2006 | Walton et al. | |
| 7,117,396 B2 | 10/2006 | Komarla et al. | |
| 7,146,533 B2 | 12/2006 | Lindsay et al. | |
| 7,308,610 B2 | 12/2007 | Kuramkote et al. | |
| 7,308,638 B2 | 12/2007 | Nerl et al. | |
| 7,313,749 B2 | 12/2007 | Nerl et al. | |
| 7,343,529 B1 * | 3/2008 | Klinkner et al. | 714/57 |
| 7,346,812 B1 | 3/2008 | Wickeraad | |
| 7,437,651 B2 | 10/2008 | Nerl et al. | |
| 7,546,487 B2 | 6/2009 | Marisetty et al. | |
| 2004/0019835 A1 * | 1/2004 | Marisetty et al. | 714/48 |

OTHER PUBLICATIONS

Hewlett-Packard Company, Fault Monitoring on HP Integrity Servers, 2003, 13 pages.

* cited by examiner

*Primary Examiner* — Sarai Butler
(74) *Attorney, Agent, or Firm* — Walter W. Karnstein

(57) ABSTRACT

A method of managing errors in a data processing system may involve at least one computer system. Each computer system may include a processor that executes an operating system, firmware, and system memory storing instructions for the operating system. A firmware error handler resident in the firmware may identify an error occurring in the computer system. The firmware error handler may determine whether the operating system is required to take an action in response to the error. If the operating system is not required to take an action in response to the error, the firmware error handler may create an error log accessible to the operating system appropriate to cause the operating system to take no action.

15 Claims, 5 Drawing Sheets

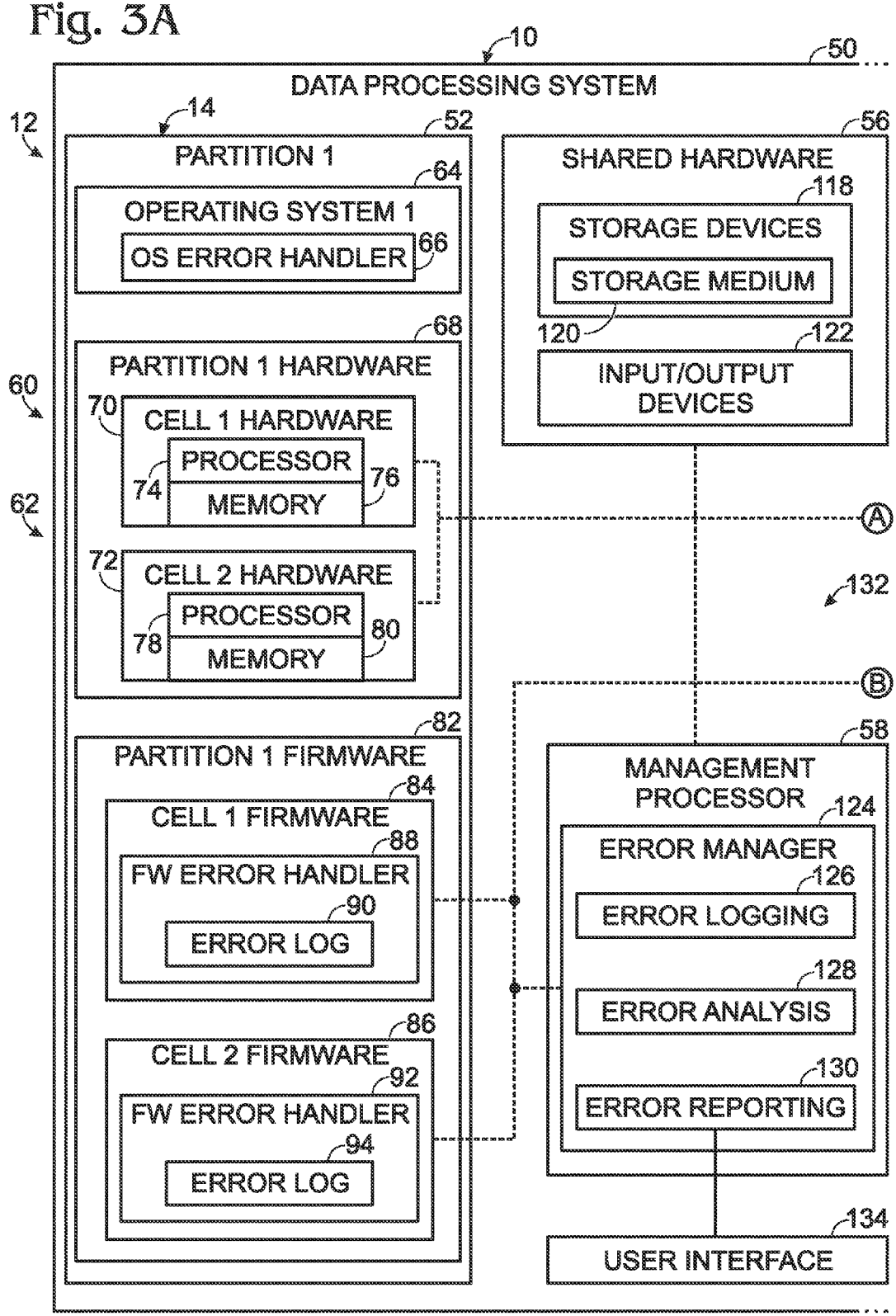

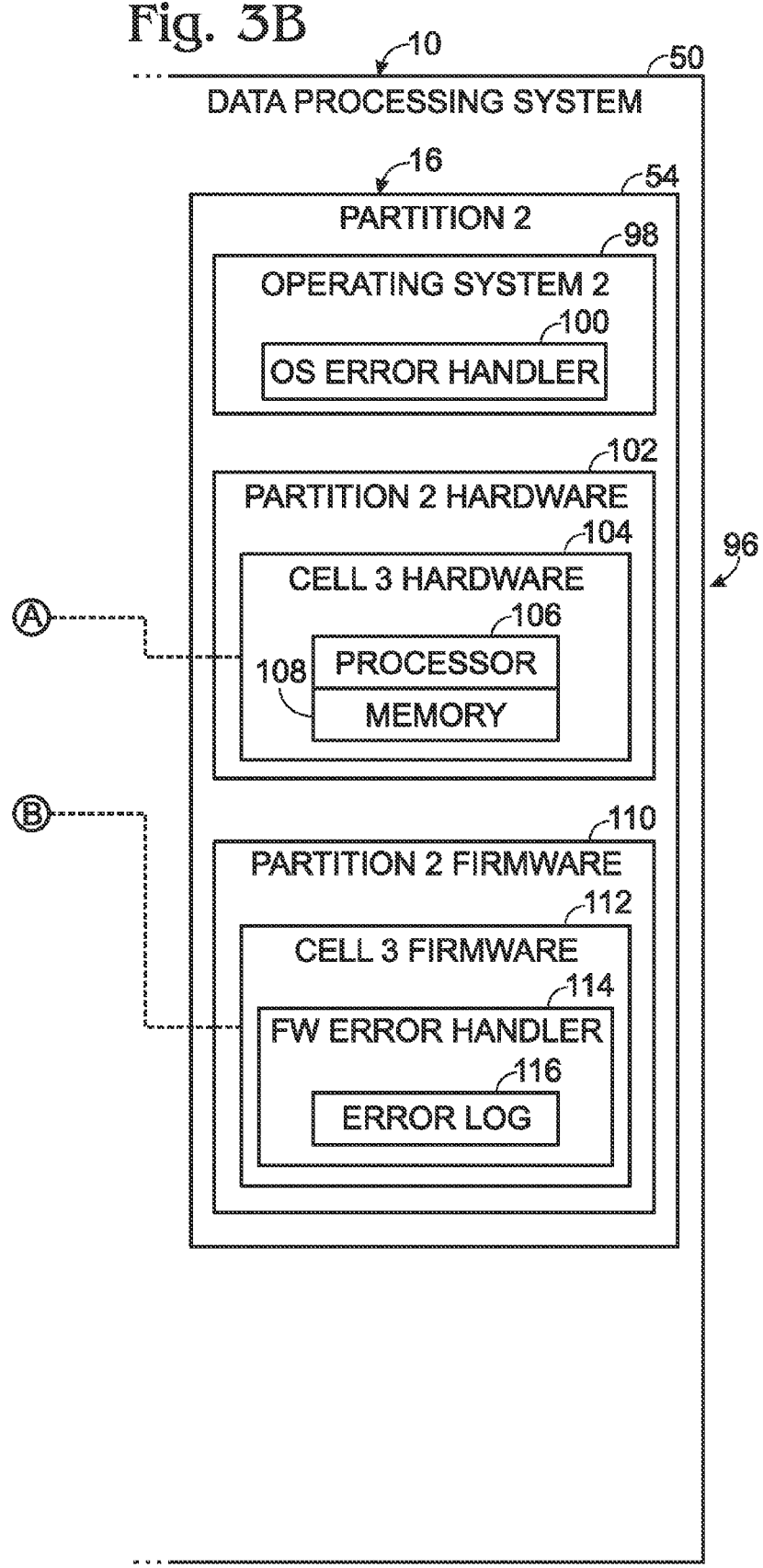

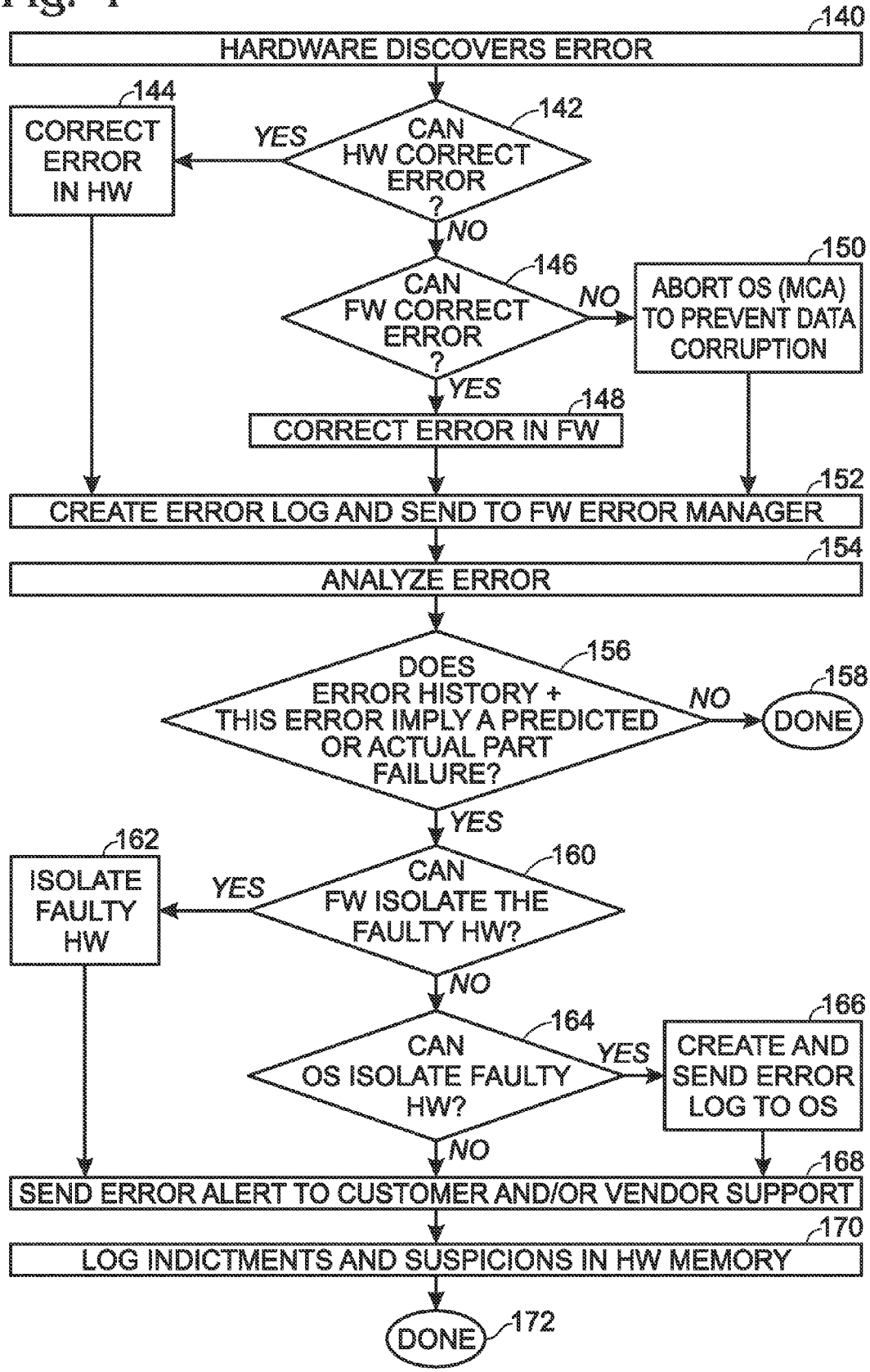

HANDLING ERRORS IN A DATA PROCESSING SYSTEM

BACKGROUND

As customers consolidate more workloads on servers, they rely on their servers more than ever, and their expectations for server reliability, availability and serviceability increase. At the same time, smaller semiconductor features, high speed serial links and stringent power requirements are driving error rates up and require significant effort to meet user expectations while not significantly inflating the cost of the server.

Computer systems can be divided into two basic types: those for which the hardware and firmware allow more than one OS to be run at the same time in different partitions without any special features being present in the OS (partitionable) and those that don't (non-partitionable). Partitionable computer systems may have one or more cells or blades, with each cell containing a processor, memory, and I/O connections. Multiple cells may be stored in an enclosure and interconnected by high-speed communication links. A data processing system may include several enclosures interconnected and acting as one or more computer systems of one complex data processing system. Any set of cells may form a computer system, referred to as a partition, running on an operating system (OS).

In complex systems, a manageability processor typically exists in each cell. The manageability processors, connected to each other and to a common system administrator via an internal connection, such as an Ethernet or USB connection, cooperate to manage the complex system. System firmware (FW) also communicates with the manageability processors and helps manage partitions. System firmware runs on host processors and is similar to the BIOS on PCs, although it is broken into separate components with standard interfaces like the Processor Abstraction Layer (PAL) provided by Intel, and System Abstraction Layer (SAL) provided by Hewlett-Packard.

Computer systems conventionally monitor hardware errors on the system using OS-based agents. It is important that error monitoring software view the hardware continuously over time because a typical single corrected error is not meaningful. Today's integrated circuits have been miniaturized to the point where cosmic radiation is expected to cause an occasional bit-flip in large silicon structures. IC's have therefore been designed to detect and correct these errors, such as by using extra memory bits to implement an error correction code. A single error or even a few errors happening at the same time is not unexpected, and does not provide any indication that the integrated circuit is faulty. The situation is similar with high speed serial links: an occasional error can occur due to natural circumstances, can be detected and corrected, and does not imply a hardware problem. Hardware monitoring therefore relies on the analysis of errors that occur on an integrated circuit or high speed serial link over time.

Virtualization allows partitioned servers to make more effective use of partitioned resources by allowing resources to move dynamically between partitions as needed. Virtualization decouples an OS-instance from hardware, allowing a server to context swap between OS-instances. Resources, like CPU cores, can be shifted between partitions depending on system load and various other criteria. Resource shifting can take place while the OS's are running. Monitors running under an OS running in a partition only see errors that occur on hardware associated with the OS at the instant the error occurs. Because resources may be moved between partitions, an OS may only have access to an incomplete history of the errors occurring in a particular hardware resource over time, or multiple OS's may duplicate error reporting for a shared hardware resource. On-line diagnostics that run in the operating systems in each of the partitions require field service personnel to log into each partition to discover the health of the system.

BRIEF DESCRIPTION OF THE DRAWINGS

Features and advantages of examples of systems, methods and devices will become apparent by reference to the following detailed description and drawings.

FIGS. 3A and 3B are a block diagram depicting another example of a data processing system in accordance with an embodiment of the invention.

FIG. 4 is a flow chart of another example of a method of handling errors in a data processing system in accordance with an embodiment of the invention.

DETAILED DESCRIPTION

Figure 1:
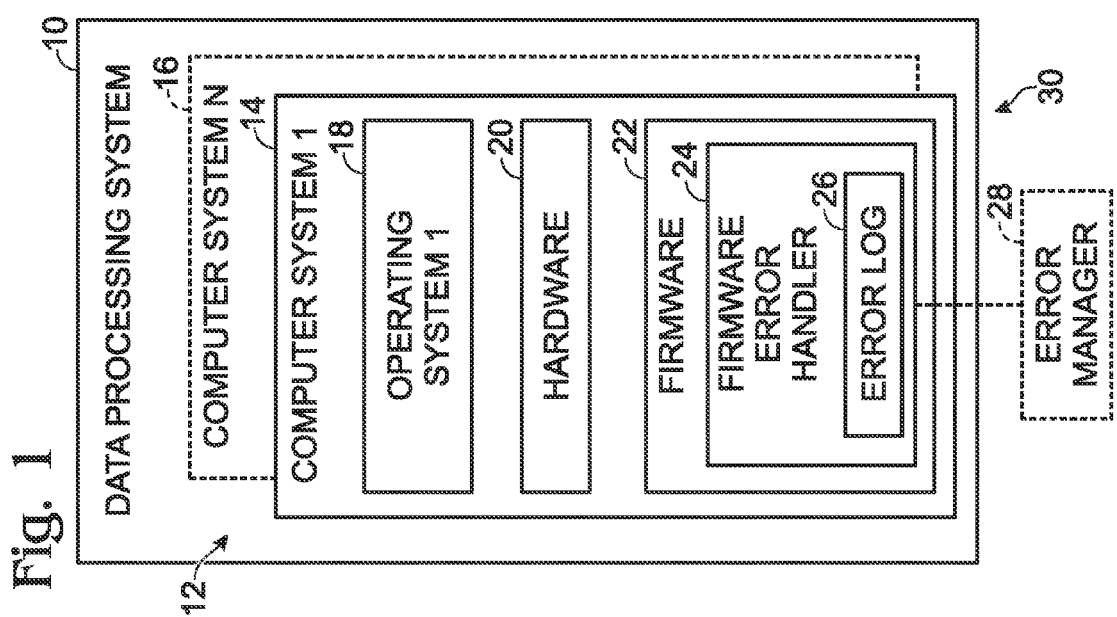
FIG. 1 is a block diagram depicting an example of a data processing system in accordance with an embodiment of the invention.

Methods and systems for managing errors in a data processing system may take many forms. FIG. 1 depicts an exemplary architecture utilized to provide a conceptual framework to discuss error (or fault) management. The architecture illustrated in FIG. 1 is directed to a data processing system 10. Data processing system 10 is intended to refer to an assembly 12 of N computer systems, or simply computers, where N is a positive integer. Thus, assembly 12 may include a single computer system 14, or a plurality of computer systems, including an Nth computer system 16 for the example where N is greater than one. In an assembly of associated plural computer systems (a "complex"), each computer system may be a partition, as is discussed further with reference to FIG. 3. Although the terms data processing system and computer system may be synonymous generally, as used herein, a computer system is a system operating according to a single instance of an operating system (OS). Where there is more than one computer system, the different computer systems may operate using respective instances of the same operating system or of different operating systems.

As shown in FIG. 1, each computer system 14 or 16 may include an operating system 18, hardware 20, and firmware 22. The operating system may include modules or agents, not shown, for monitoring the health of the computer system, including the system hardware 20, and take action based on an individual error or the occurrence of errors over time. The hardware may include a central processing unit (CPU) or processor, a memory, input/output connections, chipsets, and other hardware components, not shown. Memory may be any suitable type of storage device, and may include non-volatile memory and volatile memory. The non-volatile memory may include executable software instructions for execution by the processor, including instructions for operating system 18.

Firmware 22 may have processing instructions encoded in read-only memory (ROM). Included in the firmware may be one or more error handling agents or components, referred to generally as a firmware error handler 24. The firmware error handler in turn may have an error log 26 for logging error information.

In some examples, data processing system 10 may further include an error manager 28 that is separate from the assembly 12 of computer systems. Error manager 28 may be embodied with different architectures. In one example, the error manager is embodied in firmware so that it is not susceptible to faults that can occur in an operating system. Error manager 28 may also be part of manageability processors that manage the hardware associated with an enclosure for a data-processing-system, including, for example, turning on power to the computer systems and modules making up the data processing system, as appropriate, monitoring cooling functions, interconnections between computer-system modules or cells, and configuring I/O devices and mapping them to individual computer system modules. Firmware error handlers 24 may be agents of error manager 28, and may form with error manager 28 an error-management system 30.

As is explained in further detail below, error management system 30 may concentrate error data gathered from the CPUs, chipsets, and firmware, analyze it at a central location, taking a global view of failure data from the data processing system. For example, disparate errors may be correlated and reported as only one fault from an error in shared hardware.

Figure 2:
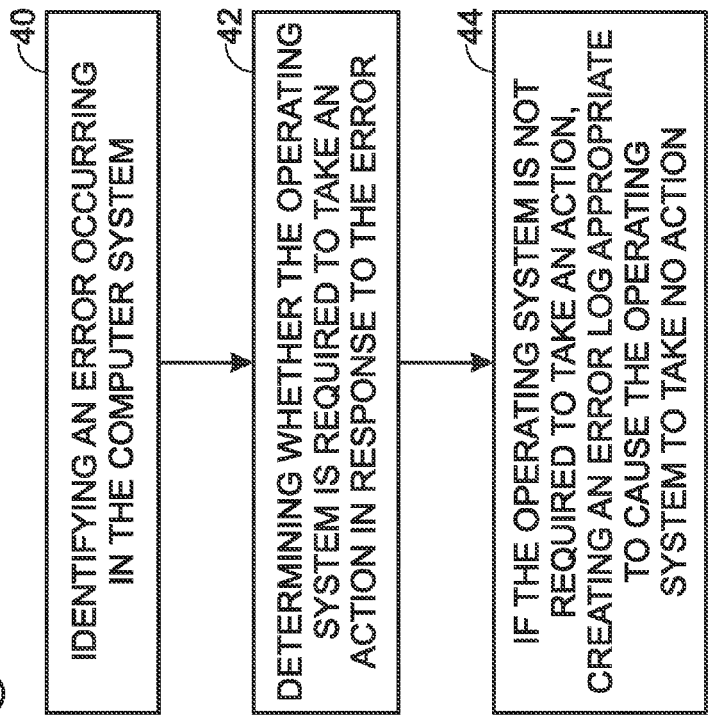
FIG. 2 is a flow chart of an example of a method of handling errors in a data processing system in accordance with an embodiment of the invention.

As shown in FIG. 2, a data processing system may provide a general method of handling errors. Each computer system 14 may be operated according to a respective operating system 18. Errors occurring in the respective computer system 14 may be identified by the firmware error handler 24, as indicated in step 40. The firmware error handler may determine in step 42 whether the operating system is required to take an action in response to the error. If the operating system is not required to take an action in response to the error, the firmware error handler may create an error log accessible to the operating system appropriate to cause the operating system to take no action.

Error information may be communicated to error manager 28, which may then compile the communicated error information. By filtering error logs based on severity and being aware of error logging queues between the error handler and the error manager, the error manager, with the help of the error handler, may handle errors that are normally handled by agents running in an OS. The error manager and error handler, when embodied in firmware, may be functional whether or not the OS can boot or has crashed, or whether or not the OS has monitoring software that is loaded and configured.

FIGS. 3A and 3B illustrate a complex example of a data processing system, shown generally at 50, as an example of a data processing system 10. In this example, an assembly 12 of computer systems includes computer systems 14 and 16. Computer system 14 is represented as a partition 52, labeled "partition 1," and computer system 16 is represented as a partition 54, labeled as "partition 2." Data processing system 50 may also include shared hardware 56 and a management processor 58. The partition, then, is an example of a computer system.

Data processing systems may include numerous computer systems, referred to generally as partitions, and partitions may be shared in a cell and may each be formed by one or more cells. Partition 52 is illustrative of a partition formed of two chip sets or cells 60 and 62 operating according to a respective operating system 64. Operating system 64 may include an OS error handler 66. Partition 52 may include partition hardware 68 that includes the hardware 70 and 72 of cells 60 and 62, respectively. Hardware 70 may include a system processor 74 (a processor that runs the OS) and memory 76 as has been described for computer system 12. Similarly, hardware 72 may include a system processor 78 and memory 80.

Partition 52 may also include partition firmware 82 made up of firmware 84 of cell 60 and firmware 86 of cell 62. Firmware 84 may include a firmware (FW) error handler 88 with an error log 90. Similarly, firmware 86 may include a firmware (FW) error handler 92 with an error log 94. The hardware and firmware for each cell are shown separately, grouped as hardware and firmware for the partition, for purposes of grouping the components by type. It will be appreciated that the hardware and firmware for each cell are mounted on a common circuit board. However, they operate collectively in association with a single operating system.

Partition 54 is illustrative of a partition formed of one chip set or cell 96 operating according to a respective operating system 98. Operating system 98 may include an OS error handler 100. Partition 54 may include partition hardware 102 that includes the hardware 104 of cell 96. Hardware 104 may include a system processor 106 and memory 108 as has been described for computer system 12. Partition 54 may also include partition firmware 110 made up of firmware 112 of cell 96. Firmware 112 may include a firmware (FW) error handler 114 with an error log 116.

Shared hardware 56 may include any hardware shared in common by the partitions (computer systems) on data processing system 50. Examples of shared hardware that may be included, depending on the data processing system, are computer processor-readable data and/or instruction storage devices 118, such as volatile and/or nonvolatile memory, hard drives, fixed memory, flash memory, CD-ROM readers, DVD readers, and the like. Depending on the storage device, it may involve a storage medium 120, such as magnetic disks, magnetic tape, CD-ROMs, and DVD's. The storage medium may or may not be removable.

Shared hardware may also include processors, such as a processor associated with management processor 58, input/output (I/O) devices 122, such as keyboards, monitors, network connections, cell interconnects that allow multiple cells to form a partition where all of the cells contribute memory that the OS can use, enclosure interconnects, and power and cooling components. Some shared hardware may also be able to log errors. For example, an enclosure interconnect that is part of the chip set may log errors in addition to performing other functions, such as re-routing packets to an alternate link when errors occur in a given link.

Management processor 58 may include an error manager 124 that may have various functional components, such as an error logging component 126, an error analysis component 128, and/or an error reporting component 130. Error manager 124 and the respective partition error handlers may form, in combination an error management system 132. The error manager may be embodied in firmware and may run on the management processor in order to make it functional without dependency on the health of system processors 74, 78, and 106. The shared hardware may also be monitored by the management processor.

The management processor function may also be distributed among local management processors in the cells that are separate from the system processors. These local management processors may be part of the cell firmware, or they may be separate processors with associated memory. Those local management processors may work with the system processors in the cells to gather error logs for hardware in the cell. The cell error logs may then be forwarded to the management processor 58.

A detailed explanation of the function of error manager 124 and the three components is provided below. Generally, error logging component 126 may monitor system hardware and may collect error data when the firmware or hardware (chipset) detects an error. The error logging component may create bundles of error logs and deliver them to error analysis component 128. Error logging component 126 may also control which error logs are delivered to the operating system in each computer system or partition.

The error analysis component 128 may analyze error data, may identify trends that signify problems requiring attention, and may initiate actions that might mitigate problems, such as isolating a hardware component, or identifying a hardware component as needing replacement. The error reporting component 130 may include a data base of error or fault information, including "indictments" and "acquittals" of field-replaceable units (FRU's), and reporting of error and fault information, such as to a single user interface 134 for users and field support engineers to see the health of the hardware in the system, as is discussed further below with reference to FIG. 5. A part is indicted when the error manager determines that it needs to be serviced. A part may also be logged as being "suspect" if it is determined to be a possible cause of a problem. A part is acquitted (indictments and suspicions are removed) when the system is serviced or the part is replaced, so that the part appears to be "healthy" in the database. As is discussed further with reference to FIG. 5, in some examples, error reporting component 130 may write failure data to non-volatile storage as an error-information repository on the FRU's, such as to a non-volatile memory 76, 80, or 108 of cells 1, 2, or 3, respectively.

FIG. 4 illustrates generally an example of a flow chart for handling errors by error management system 34 or 132. When an error occurs, the affected hardware discovers the error, as shown in step 140. The hardware determines if it can correct the error in step 142. If the error can be corrected by the hardware, the hardware corrects the error in step 144. If the error cannot be corrected by the hardware, such as when the firmware needs to flush a cache, the associated firmware error handler determines whether it can correct the error in step 146.

If the error is one that the firmware error handler can correct, such as by isolating a hardware component from use, the firmware error handler takes the necessary action in step 148. When an error cannot be corrected in hardware but can in firmware, the actual error correction is done in firmware, by (for example) the processor abstraction layer (PAL) of firmware. The firmware error handler may be aware of what resources in the system can be monitored directly by management processors, and may not poll those resources for error information.

If the firmware error handler is not able to correct the error, the actions necessary to correct the error may be handed off to the operating system (OS) at step 150. This may be a situation that involves terminating a process, such as in a correctable machine check abort (MCA). This type of error may be where an uncorrectable error has occurred, but the OS can survive by terminating one process that would see corrupt data if it were allowed to continue.

Some computer systems provide a firmware call to retrieve error logs such as the SAL_GET_STATE_INFO call in the System Abstraction Layer (SAL) that is part of the Itanium™ Processor Architecture provided by Intel Corporation of Santa Clara, Calif. OS's may poll SAL_GET_STATE_INFO for errors or call it when they get an interrupt such as a Corrected Machine Check Interrupt (CMCI). When the firmware error handler sees an MCA, it may send to the OS only the error data necessary for the OS to terminate and to dump memory. The OS may use MCA data to determine, for example, which I/O devices need to be reinitialized so that memory can be dumped.

Once the error is corrected, in step 152 the hardware and/or firmware error handler involved in the error correction may create an error log to describe what was done, clear the error, and send error information to the error manager 124, or more specifically the error logging component 126, such as via an error logging queue. In the case where the error was corrected by the hardware or the firmware error handler, the firmware error handler may tell the OS that no errors were logged. This may be accomplished by providing the OS an empty error log when it polls SAL_GET_STATE_INFO. Conventionally, SAL_GET_STATE_INFO returns all error data to the OS. In effect, then, the errors may be hid from the OS and provided to the firmware error manager. As a result, the firmware error manager has error information that the OS's do not have, and the firmware error manager may be configured to handle the errors.

As indicated previously, the error logging component may create bundles of error logs that pertain to a particular error that was experienced, and deliver them to error analysis component 128. At step 154, the error manager, and in particular the error analysis component may analyze the error. In particular, the error analysis component may look at the particular error, plus other errors that have happened, if any, and may determine in step 156, based on hardware maintenance policies or models, whether there is sufficient evidence that a hardware problem exists. If not, no further action may be taken, as shown in step 158.

If there is sufficient evidence to conclude that a hardware problem exists, the error analysis component may identify the most likely failed or failing Field Replaceable Unit (FRU), and any other hardware that might be "suspect". A determination may be made at step 160 as to whether the associated firmware error handler may isolate the faulty part. If the firmware error handler may isolate the faulty part, the part may be isolated in step 162 by taking appropriate action.

If the firmware is not used to isolate the faulty part, a determination may be made at step 164 as to whether the OS may be used to isolate the faulty part, such as, for example, when a decision is made to isolate some hardware resource because there is risk that it will fail and cause a system crash, such as when a CPU exceeds a threshold for corrected cache errors. This also may be done after seeing several corrected errors that have all happened in, for example, a particular processor. In that case, the error analyzer component may notify the OS so that the OS will stop scheduling processes on that particular processor, which would greatly reduce the likelihood that that processor could experience an error and therefore crash the system.

If so, then the OS may be notified in step 166, as appropriate, such as by fabricating a standard SAL error log and putting it in a queue for the firmware error handler to deliver to the OS the next time the OS polls SAL_GET_STATE_INFO. Also, flags in SAL error logs may be used that cause OS's to treat hardware as failed. SAL_GET_STATE_INFO may be modified to look for such error logs from the error manager and deliver them to the OS on the next poll. In some examples, the error manager may be able to use a firmware interface to request that the OS "eject" the faulty component.

In step 168, error alerts may be sent to the user and/or to the vendor of the system, such as through user interface 134, or through one or more separate communication links. An error alert may be sent to the user and/or to the vendor, for example, to notify them that there is a problem that needs their attention. In some examples, an action may be taken to isolate hardware without sending an alert. This step may be performed when the error history including the current error implies a predicted or actual part failure. Further, it may be performed regardless of whether the firmware or OS isolate the faulty hardware.

In step 170, the error reporting component 130 may store error information in a database in non-volatile memory of the affected hardware, such as in the individual cell or computer system memories and/or the shared hardware memory. This may include logging indictments and suspicions of the faulty part. This then completes the general process of error management, as shown in step 172.

Figure 5:
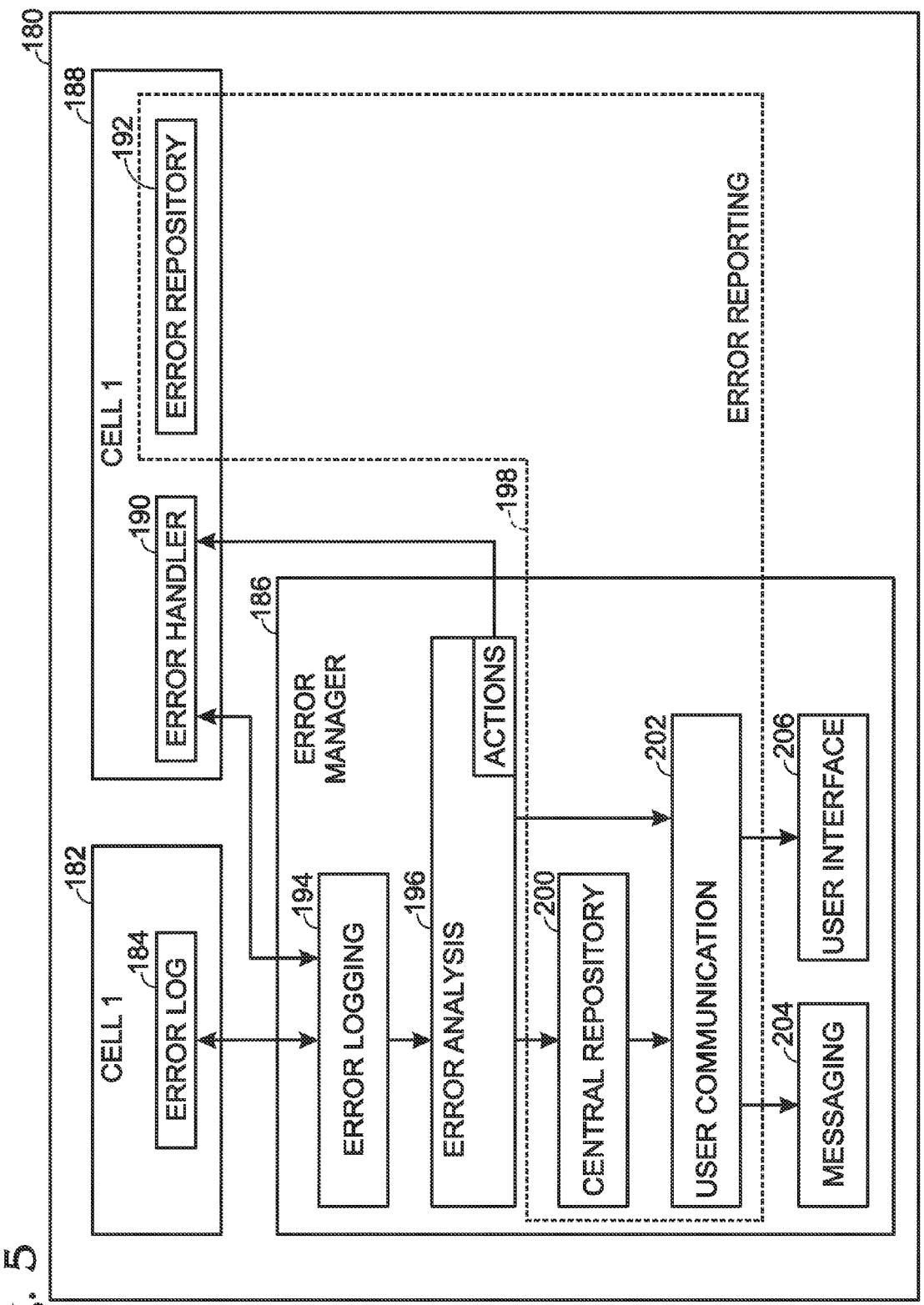
FIG. 5 is a block diagram illustrating an example of an error management system in accordance with an embodiment of the invention.

A simplified example of an error management system 180 is illustrated in FIG. 5. Error management system 180 may be part of a data processing system as illustrated in FIGS. 1, 3A and 3B. In some examples, a cell 182 may only have error logs, such as error log 184 accessible by error manager 186 of the data processing system. In some examples and as described with reference to FIGS. 3A and 3B, a cell 188 may have a firmware error handler 190, as well as a local error repository 192. As has been mentioned, the error repository may be a part of a non-volatile memory or other storage device. The functionality of error management system 180 may reside in some examples predominantly with error manager 186 and may be shared to different extents between error manager 186 and respective error handlers 190 in different data processing systems.

FIG. 5 provides an example of a representative error management system 180 that illustrates concepts involved in error management and provides a framework for describing further examples of error management by the error management system. Corresponding components and features of data processing systems 10 and 50 may apply to error management system 180, and the described components and features of error management system 180 may apply to data processing systems 10 and 50. Accordingly, the particular configuration of parts and interrelationships may vary. The concepts may apply to data processing systems of different configurations. For example, the cells shown may be part of the same or different partitions or computer systems, and the cells may embody respective computer systems. One or both of the cells may be part of computer systems having a plurality of cells, and the data processing system may include only one of cells 182 and 188, and may include cells in addition to one or both of cells 182 and 188.

Error manager 186 may include an error logging component 194, an error analysis component 196, and an error reporting component 198, as have been explained with reference to FIGS. 3A and 3B for error manager 124. Error reporting component 198 may include a local error-information repository 192, as well as a central or system repository 200, which may be in the form of respective databases, and a user-communication component 202. The user-communication component may provide communication to users and vendors via messaging services 204 and/or through a user interface 206.

Cell 182 is representative of a cell of a computer system that may store error information in error log 184 that error logging component 194 can access. The error information may then be concentrated and passed to error analysis component 196 for analysis and subsequent reporting.

Error management system 180 may centralize error analysis in systems that run many OS's simultaneously and may handle errors in platform hardware without relying on OS-based error-handling features. As has been explained and as is explained further below, this may be accomplished by hiding errors from the OS's and instead deliver error data to the error analysis component 196 via error logging component 194. Conventionally, each OS performs error analysis. Error management system 180 may provide centralized error management that may be independent of the one or more OS's.

As has been explained, in cell 188, firmware error handler 190 may log errors in the cell chipset without OS involvement. In some examples, the cell chipset may be configured via manageability CPUs, such as management processor 58 of data processing system 50, as opposed to the operating system CPU's that run the partitions' loads. An example of manageability firmware that may be used to configure a cell chipset is called central electronic complex (CEO) Firmware (CFW). When the cell chipset is appropriately configured, it may notify CFW when an error occurs and CFW may log and clear the error without OS involvement.

The error logging component 194 may be part of CFW and may be invoked when the cell chipset detects an error. As has been explained with reference to FIG. 4, error logging component 194 may look at the error that was logged, and if the error was corrected by hardware, the error logging component may create a log and send it to error analysis component 196 for analysis. If the error is uncorrected and causes the operating system to take a fatal, unrecoverable Machine Check Abort (MCA), the error logging component may clean up the error, through actions taken with error handler 190, and create error logs for it.

Error containment procedures may be followed that prevent corrupt data from being written to the system storage devices. For example, poison data may be considered that raises an MCA in any entity that consumes the poisoned data, thus preventing the poison data from being used. Poison data may cause a local MCA that affects only the resource receiving the poison data and may allow, in limited cases, the OS to recover by terminating the process that requested the poisoned data.

As another example, a fatal error virus may be data that causes a part of the system that receives the virus to go into fatal-error containment and to spread the virus with outbound packets. Fatal errors that spread the virus are not recoverable and cause a global MCA that causes the whole partition to crash. The error logging component may clean up a virus by propagating the error to the entire partition or computer system to ensure that the error is contained and no corrupt data is written to the user's disks. The error logging component may propagate the effect of the virus to all of the resources, such as the CPUs, memory controllers, chipset and I/O devices, in the partition, and even resources that are not frequently used, by setting the partition's resources to go into fatal-error mode.

Once the virus has been spread to all of the resources in the partition, all of the CPUs in the partition are in an MCA handler in firmware and all I/O has been stopped. The error may be considered to be contained when the OS and its applications are no longer running. To clean up the error, the error logging component may mask the error so that it stops propagating. This tells the chipset to stop spreading the fatal error virus so that errors can be cleared without the virus retriggering the error condition.

This may be accomplished by one or more actions by the error logging component. Error logs may be created by reading registers in the chipset and CPUs. The error logs may be bundled so that error analysis component 196 can analyze them as a single event. The registers that log the errors may be cleared, taking the chipset out of fatal error mode. I/O devices and other cell chipset functions may be re-enabled. Caches may be flushed and in-flight transactions may be given time to reach their destinations, to prevent them from setting the partition back into fatal error mode. Errors logged in the course of cleaning up the chipset may be cleared. Errors may also be unmasked and the OS MCA handler may be called so that it can dump memory to disk.

Conventionally, errors in CPU cores are logged by using a PAL call, PAL_MC_ERROR_INFO, and thus the system CPUs have to be involved in logging errors in the cores. OS's conventionally do not call PAL_MC_ERROR_INFO directly, and instead get CPU-core error logs by calling the SAL procedure SAL_GET_STATE_INFO (which calls PAL_MC_ERROR_INFO). In error management system 180, SAL_GET_STATE_INFO may be configured to put the error logs returned by PAL_MC_ERROR_INFO into shared memory where the management processor, and thereby error manager 186, can get them. Error may be returned to the OS in the case of an MCA, as indicated at step 150 in the flow chart of FIG. 4. When the OS takes a Corrected Machine Check Interrupt (CMCI) as the result of a corrected error, the OS will not get any error logs from SAL_GET_STATE_INFO and the error logs may be sent only to the error manager 186. In some examples, error manager 186 may simply mask the CMCI if permitted by the operating system. Most OS's handle spurious interrupts without further action.

Having a centralized core error analysis component may allow new error types to be analyzed with the addition of new analysis modules. Error analysis component 196 may be configured to analyze CPU's, memories, I/O's, cell interconnects, manageability hardware, errors reported via events of the platform management standard Intelligent Platform Management Infrastructure (IPMI), and other firmware messages.

Error analysis component 196 may use a chain of decoders for decoding the error log. The decoded error log may be broadcast to the various types of analysis modules. The analysis modules may choose to handle any error type and may identify the failed FRUs, indicting the FRU, using the error reporting component interface, and taking appropriate self-healing actions. Some examples of self-healing actions taken by the error analysis component may include deconfiguring processor cores, sparing a cache line in a cache controller, invoking DRAM Erasure on a Memory Logical Rank, and retraining partition fabric at a lower frequency when excessive errors of certain types are observed. Passing all errors to all analysis modules may allow disparate errors to be correlated and multiple analyses may be performed for the same error in a modular fashion. For example, the CPU analysis module may see that the inlet air temp is high and report the inlet temperature problem rather than a CPU over-temperature failure so that the user knows the server has detected an environmental problem rather than a CPU problem. Error rates may be compared to a threshold and failed FRU's may be inferred using algorithms representing applied maintenance policies or models.

The error analysis component may track the history of failed FRU's and may use the history to make analysis more accurate, keeping a field service engineer from repeatedly replacing the same part. The error analysis component may notify the user and vendor via user communication component 202 through message component 204, such as by using emails, SNMP traps, paging the customer, WBEM Indications, WS-Man Alerts, or other forms of electronic communication. WS-man alerts are described further below. These alerts may allow the error management system to request service from the service personnel, such as through Instant Support Enterprise Edition (ISEE) provided by Hewlett-Packard Corporation. The request may contain the details of the failed FRU, like serial number, part number, physical location, and manufacturer, along with other details, like the event summary, description, severity, cause and recommended action. These alerts may be sent when the failure causes a performance problem or risks crashing the system. The error analysis component also may provide an event viewer that allows a user to look at all WS-Man events generated on a particular platform within a specified time period. The WS-man alert may contain an error log bundle identifier that allows ISEE to get the raw error logs from the management processor. This may allow post-processing of error logs at a remote site, such as a vendor's customer-support datacenter.

The error manager may enable online analysis of local and global MCAs. The error logging component may retrieve MCA records and pass them to an MCA analysis module, which may identify and deconfigure the failed FRU before sending a WS-Man event indicating that the FRU requires service. The whole analysis may be completed before the next reboot, which may help in bringing the partition up with only healthy components. This may reduce or avoid repeated failures of the faulty FRU, and may reduce or avoid unplanned downtime.

In examples in which the error manager runs in manageability hardware, the error analysis component may analyze faults that prevent the OS from booting, and the full capabilities of the fault monitoring and analysis implementation are available to isolate the failure and report conclusions through the standard notification path to the user monitoring application and to the vendor. As a result, problems may be discovered quickly and the correct parts may be dispatched with the service personnel responding to the service call. By automatically deconfiguring faulty components that caused a crash, the server may be enabled to reboot automatically, thereby lowering the risk of another crash.

In addition to taking automatic corrective action where possible, the error manager may notify users and vendors of hardware problems, through user communication 202, so they can be fixed with little disruption in system uptime. For example, the error analysis component may generate events that comply with the WS-Man Alert standard to report these problems. WS-Man is a Distributed Management Task Force (DMTF) server manageability standard. This standard applies much of the Web-Based Enterprise Management (WBEM) standard that has gained industry-wide acceptance, but adds valuable features that increase reliability and security. Major OS vendors are pushing the market to adopt the WS-Man standard, and the vendors of operating systems may require it. Notification via Simple Network Management Protocol (SNMP) traps may also be implemented.

The error manager may report platform events from one location, i.e., the management processor containing the error manager, with the exception of those errors that are reported by the OS's (such as some I/O errors, software errors and resource issues like disk capacity warnings.) The error manager may reduce the set of events reported by the OS, however, and may increase the likelihood that there is a working and stable platform for the OS to run on to report those problems.

Particularly in the example in which the error manager is running in firmware, the error manager may have flexibility in the automatic recovery actions it can take in response to errors, including direct control of the chipset. This direct interface to the chipset allows the error manager to implement error handling features without intervention by the OS or user. For example, the error manager may track errors in the cell's L4 cache and map in spare cache lines when a problem is detected, healing the server without any intervention from the user. If analysis indicates that it is appropriate, the L4 cache may be deconfigured by the error manager. The error manager may also deconfigure DIMMs, pairs of CPU cores, entire CPU sockets, fabric links, PCIe root ports (RPs), I/O Hubs (a collection of root ports), or entire cells if its analysis shows that these actions would result in a system that is less susceptible to crash due to a hardware failure.

For the high speed interconnects between cells within a partition, the error manager may enable resiliency features such as end-to-end retry and link width/frequency reduction. Faulty DRAMs may be isolated, if necessary, using double-chip-kill, a technique to eliminate DRAMs without reducing the total memory available to the machine, without requiring a reboot, and without loss of significant error correction capability. As has been explained, the error manager may deal with certain errors so that OS's may recover from some types of Machine Check Aborts (MCAs).

The error manager also may enable the use of standard mechanisms to perform functions that previously required extensive online diagnostic support. For example, an OS may not monitor the health of a CPU (or CPU core), and when the CPU is found to have an error history that implies risks of CPU failure, and take the CPU out of service and identified for deconfiguration (configured to be shut off electrically at the next boot). The error manager may monitor CPU health and may predict CPU failures in firmware. It may then trigger a standard Advanced Configuration and Power Interface (ACPI) method to eject the failing CPU or CPU core(s). The error manager may indict the CPU so that it is not used the next time the OS boots and it can tell the partitioning firmware to add an unused CPU to the partition to replace the failing CPU.

The error reporting component may provide a database, such as central repository 200, that may be queried to provide support personnel with a central location and a single login to see hardware problems in the data processing system. This database may allow a user or vendor to see, for example, a list of FRU's that have problems. It may also allow service personnel to manually deconfigure and reconfigure hardware that is believed to have problems. The error reporting component may provide a central source of information for support personnel whether or not monitoring agents, such as local error repository 192, are installed on all of the OS's or cells, and whether or not partitions have been deleted or OS's have been reloaded.

In addition, the error reporting module may keep a history of indictments and acquittals for each FRU. The error manager may not always be able to tell which FRU caused a problem. This history may allow service personnel to see that a problem has been previously seen and that some different action should be taken. For example, if a DIMM has already been replaced because of address parity errors, and a replacement DIMM continues to exhibit address parity errors, the problem may be with the blade and not the DIMM.

Indictments may come from firmware that detects failures, such as a memory self test, and may come from the error analysis component analyzing an error. When the error reporting component receives an indictment request, it may forward it to the error analysis component, so that the error analysis component may inform the user of the problem via a WS-Man alert. Once the error analysis component has generated the alert, it may tell the error reporting module to create the indictment record, passing it a unique identifier for the alert. By doing this, the error analysis component may be able to override indictments, and the error reporting component may display the contents of the WS-Man alert. Overriding indictments of a part may be useful in cases where the error analysis component has more information than the other firmware that tried to indict the part. For example, a CPU might fail to boot, causing firmware to indict it, but the error analysis component might see a voltage regulation module failure and override the CPU indictment since the CPU is not the problem. Displaying the WS-Man alert may be useful because it contains detailed information about the failure, including a list of problem causes and actions that might resolve the problem causes.

Another function of the error reporting component may be to write information about problems and how they were discovered into the Field Replaceable Unit (FRU) itself, such as into error repository 192 of cell 188, for subsequent analysis in a parts repair center. The data written to FRU's also may be analyzed by service personnel to update the reliability models and identify particular components or designs that have unexpectedly high error rates due to design or manufacturing problems.

Online diagnostics included in the error manager may rely on the ability to use thresholding to detect impending system crashes. When the rate of corrected errors from a part exceeds the expected error rate (the threshold), the diagnostic may determine that the part has a problem. Thresholding against expected error rates may have a risk in that the expected error rate is built from failure models that may not be accurate. With some information or assumptions about a silicon vendor's process, it may be possible to estimate the size of structures in silicon and determine a FIT (Failure In Time) rate for a part. However, there may be many ways such models may be invalidated and there may be limited failure data from the field that is specific enough to correct the failure model. If the error thresholds are too aggressive, parts may be replaced unnecessarily, driving warranty costs up. If the error thresholds are not aggressive enough, the system may be more likely to crash, causing customer dissatisfaction. By writing failure data to the part itself, the error manager may provide a feedback loop that allows the failure model to be updated and analysis components in the error manager to be improved, creating the potential to save warranty costs and improve user satisfaction. As improved error detection algorithms and thresholds are created, new versions of the error manager may be bundled with firmware updates to the system.

In summary, the examples of data processing systems and methods described may provide error handling without OS knowledge or intervention or with limited OS knowledge or intervention. The examples of error management systems described may detect, correct and analyze errors not requiring OS intervention, may take action as appropriate to isolate hardware that might cause problems, may alert users and vendors about actions that they may need to take, and may log information about what is wrong in a faulty part and may make this information available to support personnel.

From the above description, it will be appreciated that a data processing system and method of managing errors may have numerous configurations. In one example, a method is provided for a method of handling errors in a data processing system having at least one computer system. Each computer system may include a processor executing an operating system, firmware, and system memory storing instructions for the operating system. The exemplary method may include identifying, by a firmware error handler resident in the firmware, an error occurring in the computer system; determining, by the firmware error handler, whether the operating system is required to take an action in response to the error; and if the operating system is not required to take an action in response to the error, creating, by the firmware error handler, an error log accessible to the operating system appropriate to cause the operating system to take no action.

A computer-readable storage device that may be readable by one or more computer systems and may have embodied therein a program of computer-readable instructions. As an example, the instructions, when executed by the one or more computer systems, may provide for identifying, by a firmware error handler resident in the firmware, an error occurring in the computer system; determining, by the firmware error handler, whether the operating system is required to take an action in response to the error; and if the operating system is not required to take an action in response to the error, creating, by the firmware error handler, an error log accessible to the operating system appropriate to cause the operating system to take no action.

Correspondingly, an example of a data processing system may include at least one computer system, and may further include means for identifying an error occurring in the computer system; means for determining whether an operating system of the computer system is required to take an action in response to the error; and means for creating an error log accessible to the operating system appropriate to cause the operating system to take no action if the operating system is not required to take an action in response to the error.

In another example, a data processing system may include at least one computer system, with each computer system operating according to an operating system and including hardware and firmware. The firmware may include a firmware error handler configured to identify an error occurring in the hardware, determine whether the operating system is required to take an action in response to the error, and creating an error log accessible to the operating system. The error log may be appropriate to cause the operating system to take no action if the operating system is not required to take an action in response to the error.

The invention claimed is:

1. A method of handling errors in a data processing system having an error management system and plural computer partitions, each computer partition including a processor executing an operating system, firmware including a firmware error handler, and system memory storing instructions for the operating system, the error management system including the firmware error handlers and a firmware error manager separate from the computer partitions, the method comprising:
    identifying, by the firmware error handlers, errors occurring in their respective computer partitions;
    hiding, by the firmware error handlers, at least some of the identified errors from the respective operating systems;
    communicating from the firmware error handlers information about the errors hidden from the respective operating systems to the error manager;
    and
    analyzing, by the error manager, the information about the errors hidden from the respective operating systems.

2. The method of claim 1, further comprising the error manager taking an action in response to a first error of the errors.

3. The method of claim 1, wherein a first of the operating systems is required to take an action in response to the first error, the method further comprising creating an error log for causing the first operating system to take appropriate action in response to the first error.

4. The method of claim 3, wherein if the first operating system is not required to take an action in response to a second error, creating an error log includes creating an error log for an error that is different than the second error so as to hide the second error from the first operating system.

5. The method of claim 3, wherein identifying the first error includes identifying the first error as a machine-check-abort error, and creating an error log includes creating an error log that causes the first operating system to reboot the system.

6. A data processing system comprising:
    plural computer partitions, each computer partition operating according to an operating system and including hardware and firmware having a firmware error handler configured to identify errors occurring in the hardware;
    an error management system including the error handlers and an error manager separate from the computer partitions, the error handlers being configured to hide at least some of the identified errors from the respective operating systems and to communicate information about the errors hidden from the respective operating systems to the firmware error manager.

7. The data processing system of claim 6, wherein the error manager is configured to take an action in response to at least one of the errors hidden from a respective operating system.

8. The data processing system of claim 6, wherein the firmware error handler is configured to create an error log for causing a first operating system to take appropriate action in response to the error when the firmware error handler determines that the first operating system is required to take an action in response to a first error.

9. The data processing system of claim 8, wherein the first operating-system is configured to take different actions for different errors, and the firmware error handler is configured to create an error log for an error that is different than a respective error in response to which the error log was created.

10. The data processing system of claim 8, wherein the firmware error handler is configured to identify a machine-check-abort error, and create an error log that causes the operating system to reboot the system.

11. A computer program product comprising a non-transitory computer-readable storage device readable by one or more computer partitions of a data processing system and having embodied therein a program of computer-readable instructions that, when executed by the one or more computer partitions, provide for:
    identifying, by firmware error handlers resident in firmware within the computer partitions of a data-processing system, errors occurring in the respective computer partitions;
    hiding, by the firmware error handlers, at least some of the identified errors from respective operating systems executing in respective ones of the computer partitions;
    communicating, from the firmware error handlers, information about the errors hidden from the respective operating systems to an error manager of the data-processing system, the error manager being separate from the computer partitions;
    and
    analyzing, by the error manager, the information about the errors hidden from the respective operating systems.

12. The computer-program product of claim 11, wherein the program further provides for the error manager taking an action in response to the error.

13. The computer-program product of claim 11, wherein the program further provides for determining that a first operating system is required to take an action in response to the error, and creating an error log for causing the first operating system to take appropriate action in response to the error.

14. A data processing system comprising:
plural computer partitions configured to execute respective operating systems, each of said computer partitions including a respective processor, respective memory, and respective firmware including a respective firmware error handler, each firmware error handler being configured to identify errors occurring in the respective partition, to hide at least some identified errors from the respective operating system, and to communicate information regarding errors hidden from respective operating systems to a firmware error manager separate from the computer partitions; and
a management processor including firmware encoded with code and hardware for executing the code to manage the computer partitions, the managing including rebooting the computer partitions, the management processor including the firmware error manager, the firmware error manager being configured to receive and analyze the information regarding errors hidden from respective operating systems.

15. The data-processing system of claim 14 wherein the computer partitions include field-replaceable units (FRUs), the firmware error manager being configured to cause results of the analyzing an error associated with a first FRU to be written to the first FRU.

* * * * *